United States Patent [19]

Wada et al.

[11] Patent Number: 5,550,597

[45] Date of Patent: Aug. 27, 1996

[54] SIGNAL PROCESSING METHOD AND SIGNAL PROCESSING DEVICE

[75] Inventors: Ryukichi Wada; Fumio Suzuki; Yoshisuke Ohtsuru, all of Kyoto, Japan

[73] Assignee: Mitsubishi Denki Kabushiki Kaisha, Tokyo, Japan

[21] Appl. No.: 494,731

[22] Filed: Jun. 26, 1995

[30] Foreign Application Priority Data

Jul. 5, 1994 [JP] Japan ................................ 6-153922

[51] Int. Cl.$^6$ ............................................. H04N 9/64
[52] U.S. Cl. .......................... 348/708; 348/712; 348/713
[58] Field of Search .................................. 348/708, 712, 348/713; 358/21 R, 39, 40; H04N 9/64, 9/77

[56] References Cited

FOREIGN PATENT DOCUMENTS 60-117984  6/1985  Japan.
6165198    6/1994  Japan.

OTHER PUBLICATIONS

*The Digital Circuit of Television Signal*, by Etoh and Achiha of Corona Corporation, Sep. 25, 1989, the 1st edition, pp. 8–10.

*Primary Examiner*—Safet Metjahic
*Assistant Examiner*—Sherrie Hsia

[57] ABSTRACT

When an input component image signal is inputted in a signal processing step, a high-frequency signal emphasis processing like HPF is performed with respect to a luminance signal and a processing like LPF with replenishment of the low-midrange frequency signal is performed in an LPF step and a color signal step with respect to color difference signals. Then, the luminance signal and color difference signals are outputted by prescribed clock pulses. The clock pulse of the color difference signals may be set lower than the clock pulse of the luminance signal according to the condition of the image. Processed as above, a new component image signal (a luminance signal Y and any combination of color difference signals U and V, V and W, W and U) is generated from a conventional component image signal (Y and U, V, W) without loss in image information or image quality. Furthermore, the amount of data of the signal to be generated per unit of time is reduced as compared with the conventional component coding system of 4:1:1 or 4:2:0 (MPEG). Thus, a signal processing method and device which enables signal transmission with lower transmission rate can be achieved.

10 Claims, 11 Drawing Sheets

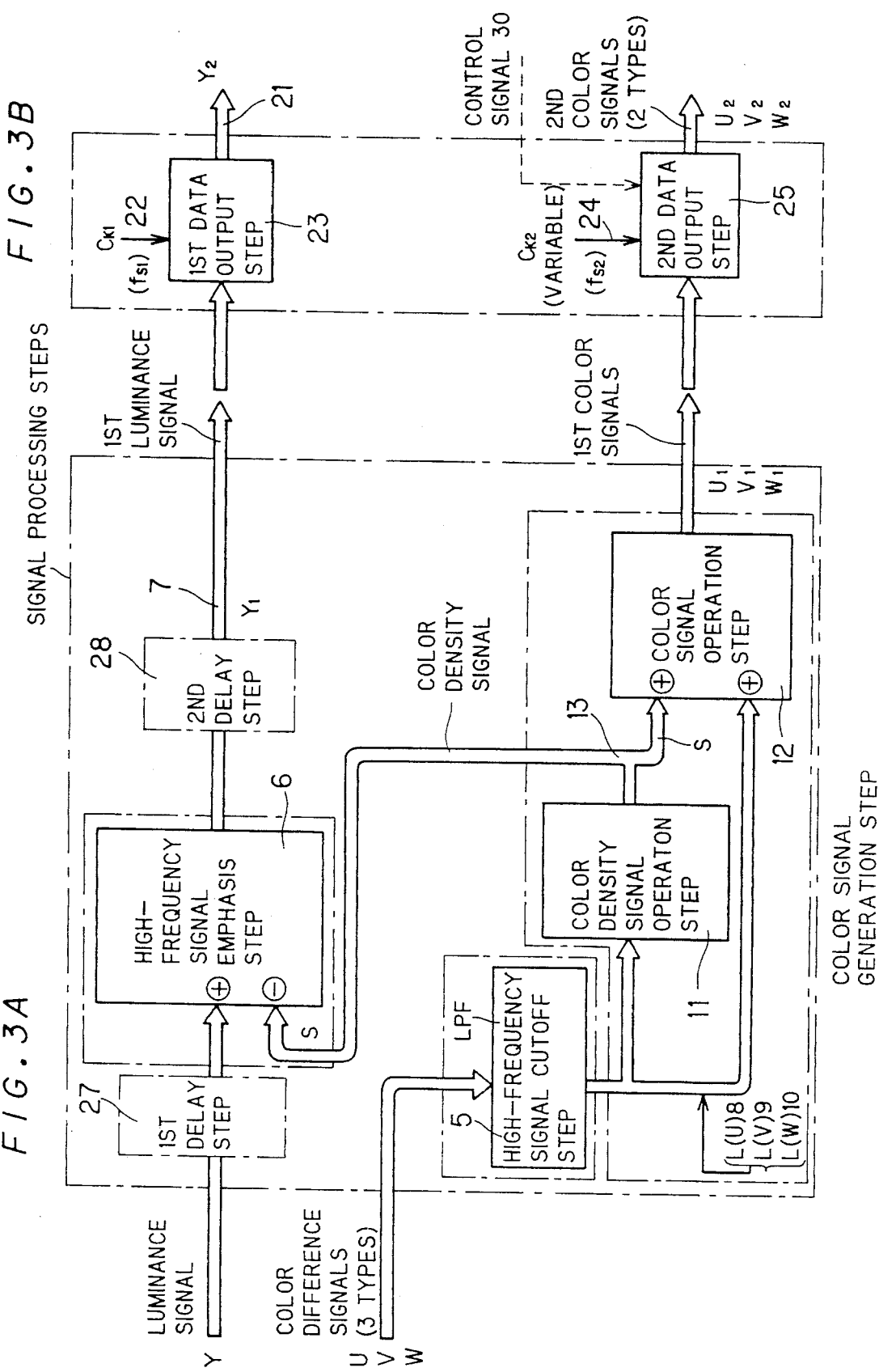
FIG. 3A / FIG. 3B

L(U), L(V), L(W)

$(U_1, V_1), (V_1, W_1), (W_1, U_1)$

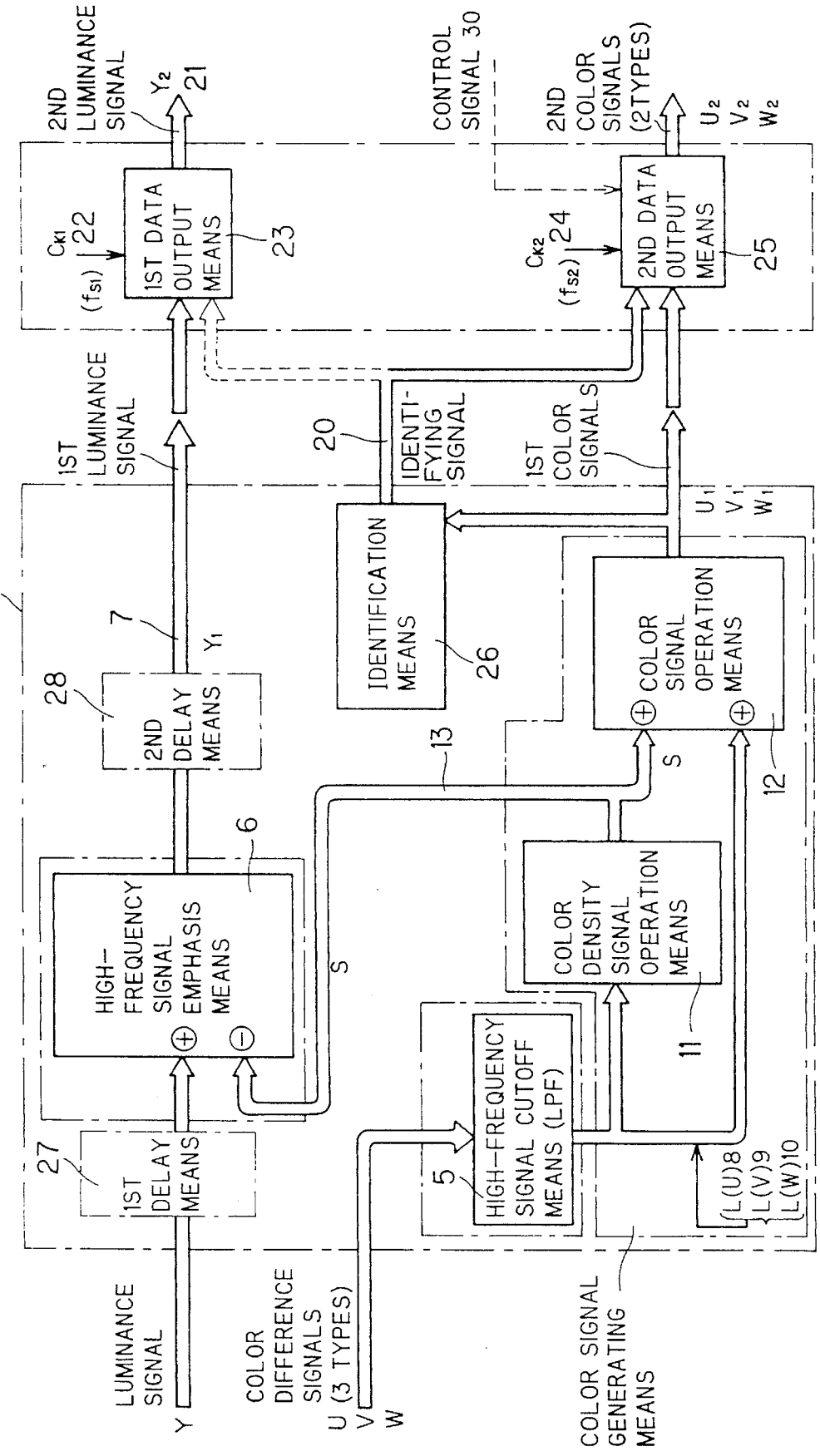

PRIOR ART

FIG. 7A

| TELEVISION SYSTEM | 525/60 | 625/50 |
|---|---|---|
| THE NUMBER OF SAMPLES PER SCANNING LINE  LUMINANCE Y  COLOR DIFFERENCE Cr, Cb | 858  429 | 864  432 |
| SAMPLING FREQUENCY  LUMINANCE Y  COLOR DIFFERENCE Cr, Cb | 13.5 MHz  6.75 MHz | |
| THE NUMBER OF VALID SAMPLES PER SCANNING LINE  LUMINANCE Y  COLOR DIFFERENCE Cr, Cb | 720  360 | |
| QUANTIZATION | 8-BIT LINEAR QUANTIZATION | |
| LEVEL ASSIGNMENT  LUMINANCE Y   COLOR DIFFERENCE Cr, Cb | BLACK : 16  WHITE PEAK : 235  128 ± 112 | |

PRIOR ART

FIG. 7B

| | |
|---|---|
| THE NUMBER OF SCANNING LINES | 1125 |
| THE NUMBER OF FIELDS PER SECOND | 60 |
| ASPECT RATIO | 16:9 |
| THE NUMBER OF SAMPLES PER SCANNING LINE<br><br>    LUMINANCE        Y<br>    COLOR DIFFERENCE  $P_r$, $P_b$ | <br><br>2200<br>1100 |
| SAMPLING FREQUENCY<br><br>    LUMINANCE        Y<br>    COLOR DIFFERENCE  $P_r$, $P_b$ | <br><br>74.25 MHz<br>37.125 MHz |
| THE NUMBER OF VALID SAMPLES PER SCANNING LINE<br><br>    LUMINANCE        Y<br>    COLOR DIFFERENCE  $P_r$, $P_b$ | <br><br>1920<br>960 |

SIGNAL PROCESSING METHOD AND SIGNAL PROCESSING DEVICE

BACKGROUND OF THE INVENTION

1. Field of the Invention

The present invention relates to a signal processing method and device for image signal processing, and more particularly, for generating a new component image signal from an inputted component image signal consisting of a luminance signal and color difference signals, which causes no loss in image quality (especially, quality of the image representing the natural picture) when the image data are reduced through a proper filtering processing (high-frequency signal emphasis processing like high pass filtering for a luminance signal and high-frequency signal cutoff processing like low pass filtering for color difference signals in order to adapt the image signals to the visual characteristics of the human eyes), data thinning in a unit of time and the like.

2. Description of the Background Art

An image signal is generally formed of a luminance signal Y and color difference signals U, V, W. For example, assuming now that three signals (R–Y), (B–Y) and (G–Y) are adopted as the color difference signals U, V and W, the relation between these color difference signals and the luminance signal Y is expressed as $$Y = 0.30R + 0.59G + 0.11B \tag{1}$$

$$R - Y = 0.70R - 0.59G - 0.11B (=U)$$

$$B - Y = -0.30R - 0.59G + 0.89B (=V)$$

$$G - Y = -0.30R + 0.41G - 0.11B (=W) \tag{2}$$

$$0.3(R-Y) + 0.59(G-Y) + 0.11(B-Y) = 0 \tag{3}$$

From three signals, e.g., the luminance signal Y and the two color difference signals R–Y(=U) and B–Y(=V), reproduction of a full-color image signal consisting of red (R), green (G) and blue (B) can be achieved by using the above Formulae (1), (2) and (3). The most common application is an NTSC (National Television System Committee) color television signal. In short, the full-color information can be transmitted with a signal combination of the luminance signal Y and any two out of the color difference signals (R–Y), (B–Y) and (G–Y).

Now, additional discussion of the component image signal and a component coding system associated therewith will be given. The component coding is a system of independently converting RGB signals, the color difference signals (R–Y, B–Y) or the like which constitute the image signal, into digital codes. In the component coding, an input image signal is called a component image signal. Since the component coding would solve the problem of the difference in modulation system, discussion of a coding system has been held in European countries where there are a variety of modulation systems.

Under these circumstances, a challenge to be solved is how to reduce the transmission rate (the number of bits to be transmitted per unit of time, normally expressed in a unit of Mb/S; Mega bits per Second) or the number of data elements per specified pixel (i.e., the amount of data) in data transmission or memory processing of the above-discussed component signals U, V by using a component coding system. Assuming that the luminance signal Y and the color difference signals U, V are digital signals, three kinds of component coding systems have been considered possible, in which the transmission rates of the digital signals are as follows. Brief discussion thereof will be given below (taking the coding systems which stand in clear contrast to the present invention by a way of example).

$$(A)\ Y{:}U{:}V = 4{:}4{:}4 (=1{:}1{:}1) \tag{4}$$

$$(B)\ Y{:}U{:}V = 4{:}2{:}2 \tag{5}$$

$$(C)\ Y{:}U{:}V = 4{:}1{:}1 \tag{6}$$

The coding system (A), in which all of the transmission rates (or the number of data per specified pixel) of the digital data of the luminance signal Y and the color difference signals U, V are equal, is a basic type of coding system. In the coding systems (B) and (C), the transmission rate (or the number of data per specified pixel) of the color difference signals is one half and one quarter the transmission rate (or the number of data per specified pixel) of the luminance signal Y, respectively, in data transmission or memory processing.

Obviously, with respect to the image quality represented by the color difference signals, the coding system (A) is the best, the coding system (B) is worse, and the coding system (C) is the worst. However, because of the visual characteristics of the human eyes that the resolution power to color is lower than the resolution power to the luminance signal, the coding systems (B) and (C) may be also used with no practical problem.

FIG. 7A shows an example of the coding system of 4:2:2 (cf. The Digital Circuit of Television Signal, by Etoh and Achiha of Corona Corporation, Sep. 25, 1989, the 1st edition, pp 8–10).

According to the parameters of FIG. 7A, the transmission rate (Mb/s) in serial transmission is 216 Mb/s (=8 bits× 13.5M+8 bits×6.75M×2) and the transmission rate in parallel transmission with 9 transmission lines consisting of 8 data lines and 1 clock line is 27 MH (=13.5M+6.75M×2) per line. Practically, a redundant bit is needed. Assuming now that 1-bit redundant bit is needed with respect to the 8-bit data, the transmission rate is 243 Mb/s (=9×13.5M+9× 6.75M×2) in serial transmission.

When two transmission lines for the luminance signal and the color difference signal (where the redundant bit is omitted) are separately provided in parallel, it is found from the above calculation that the transmission rates of the luminance signal and the color difference signals (U, V) are each 108 Mb/s. In addition, a clock transmission line of 108 Mb/s is also needed. Anyway, transmission lines to assure the transmission rate of around 100 Mb/s are required (in parallel transmission). This coding system (4:2:2) is the standard of recommendation of the CCIR (Consultive Committee International Radio) plenary session, which is used for the D1-format of the digital television studio and of the digital VTR.

Furthermore, for reference, FIG. 7B shows an HDTV (high definition television) coding system (cf. the above-referenced document, p10), in which the required transmission rate in parallel transmission is 148.5 Mb/s (=74.25M+ 37.125M×2) and the required transmission rate in serial transmission is as much as 1188 Mb/s (=148.5M×8).

As to the coding system (C) of 4:1:1, when two transmission lines are separately provided in parallel as above (where the redundant bit is omitted), the transmission rate of the luminance signal is 108 Mb/s and the transmission rate of the color difference signals (U, V) is 54 Mb/s.

When the transmission rate (or the number of data, the amount of data per specified pixel) of the color difference signals is lower (e.g., 4:0.5:0.5=8:1:1) as compared with the coding system (C) of 4:1:1, obviously the image quality is worse.

In this case, however, there arises advantages such as reduction in the amount of data on the whole, more specifically, reduction in the amount of used memory, downsizing in circuit scale and reduction in power consumption which are expected in a digital video, and further, reduction in transmission time for a prescribed amount of information (e.g., a frame of data) with reduction in the amount of data when the same transmission rate is used. (Or, more amount of redundant data, character data and decoded data can be transmitted in a prescribed time.)

In the background art, considering the above advantages with no loss in image quality, the coding system of 4:1:1 has been used as a practical one.

FIGS. 6A, 6B and 6C illustrate models of pixel structure in the coding systems of 4:4:4, 4:2:2 and 4:1:1, respectively.

A typical model of the signal processing method and device in the background art merely inputs a component image signal consisting of an input luminance signal Y and input color difference signals (R–Y, B–Y) and outputs an output luminance signal Y and output color difference signals (R–Y, B–Y), and performs no particular signal processing for the luminance signal Y and color difference signals U, V themselves besides a prescribed filtering processing associated with the sampling frequency ratio of 4:1:1. As a matter of course, it is well known that conversion of the coding system of 4:4:4 into the coding system of 4:2:2 or of 4:1:1 is performed in a signal processing block as shown in FIG. 6D and the like.

As discussed above, considering reduction in the transmission rate or the number of data per specified pixel (the amount of data) with no loss in image quality, the coding system in which the ratio of the transmission rates (or the amount of the image data) of the luminance signal Y and color difference signals (U, V) is 4:1:1 has been generally used in the background art. There has been a problem that the attempt to further reduce the color difference signal data results in loss in image quality of finally reproduced full-colored image.

SUMMARY OF THE INVENTION

The present invention is directed to a signal processing method for inputting an input component image signal consisting of a luminance signal Y representing luminance component and color difference signals representing color component and generating a first component image signal to be outputted consisting of a first luminance signal $Y_1$ representing luminance component and first color signals representing color component.

According to the first aspect of the present invention, the signal processing method comprises at least the steps of: emphasizing a high-frequency signal component of the luminance signal Y to output the first luminance signal $Y_1$; cutting off a high-frequency signal component of the color difference signals to output low-frequency color difference signals; and generating the first color signals from the low-frequency color difference signals to be outputted. The step of generating the first color signals follows the step of cutting off the high-frequency signal component. In the signal processing method, a luminance-signal system processing consisting of the step of emphasizing the high-frequency signal component and a color-signal system processing consisting of the step of cutting off the high-frequency signal component are performed almost in parallel.

According to the second aspect of the present invention, the signal processing method of the first aspect further comprises: the first step of outputting a second luminance signal $Y_2$ representing luminance component generated from the first luminance signal $Y_1$ at a timing determined by the frequency $f_{S1}$ of a first clock pulse which defines a final output timing of luminance signal; and the second step of outputting second color signals representing color component generated from the first color signals at a timing determined by the frequency $f_{S2}$ of a second clock pulse which defines a final output timing of color signal. The first step and the second step are performed in parallel after the step of emphasizing the high-frequency signal component and the step of generating the first color signals of the first aspect, respectively.

The present invention is also directed a signal processing method to perform a signal processing such as to adapt the image signal more specifically to the visual characteristics of the human eyes in the step of emphasizing the high-frequency signal component and the step of generating the first color signals of the first and second aspects.

According to the third aspect of the present invention, the signal processing method comprises: a color-signal system processing procedure including at least the step of cutting off a high-frequency signal component of the color difference signals to output low-frequency color difference signals, and further including the step of generating color signals, which consists of the steps of: performing a color density signal operation in which the minimum value signal among the low-frequency color difference signals is inverted in the polarity to output a color density signal S; and performing a color signal operation in which the color density signal S is added to the low-frequency color difference signals to output the first color signal, and a luminance-signal system processing procedure including at least the step of: emphasizing a high-frequency signal component of the luminance signal Y through an operation in which the color density signal S is subtracted from the luminance signal Y to output the first luminance signal $Y_1$. The step of generating the color signals follows the step of cutting off the high-frequency signal component. The color-signal system processing procedure and the luminance-signal system processing procedure are performed almost in parallel.

According to the fourth aspect of the present invention, the signal processing method of the third aspect further comprises: the first step of outputting a second luminance signal $Y_2$ representing luminance component generated from the first luminance signal $Y_1$ at a timing determined by the frequency $f_{S1}$ of a first clock pulse which defines a final output timing of luminance signal; and the second step of outputting second color signals representing color component generated from the first color signals at a timing determined by the frequency $f_{S2}$ of a second clock pulse which defines a final output timing of color signal. The first step and the second step are performed in parallel after the step of emphasizing the high-frequency signal component and the step of generating the first color signals of the third aspect, respectively. The frequency $f_{S2}$ of the second clock pulse is not zero and is one quarter the frequency $f_{S1}$ of the first clock pulse or less.

The present invention is still directed to a signal processing device for inputting an input component image signal and generating a first component image signal which is adaptable to particular characteristics, i.e., visual characteristics of the human eyes to be outputted.

According to the fifth aspect of the present invention, the signal processing device comprises: high-frequency signal cutoff means for cutting off a high-frequency signal component of the color difference signals to output low-frequency color difference signals; color signal generating means for generating the first color signals from the low-frequency color difference signals to be outputted; and high-frequency signal emphasis means for emphasizing a high-frequency signal component of the luminance signal Y to output the first luminance signal $Y_1$.

The color signal generating means includes at least color density signal operation means for performing an operation in which the minimum value signal among the low-frequency color difference signals is inverted in the polarity to output a color density signal S; and color signal operation means for performing an operation in which the color density signal S is added to the low-frequency color difference signals to output the first color signals. The high-frequency signal emphasis means includes at least operation means for performing an operation in which the color density signal S is subtracted from the luminance signal Y.

In the signal processing device, a signal processing with respect to color component is performed by the high-frequency cutoff means and the color signal generating means, and a signal processing with respect to luminance component is performed by the high-frequency signal emphasis means.

According to the sixth aspect of the present invention, the signal processing device of the fifth aspect further comprises: first data output means for outputting a second luminance signal $Y_2$ representing luminance component generated from the first luminance signal $Y_1$ at a timing determined by the frequency $f_{S1}$ of a first clock pulse which defines a final output timing of luminance signal; and second data output means for outputting second color signals representing color component generated from the first color signals at a timing determined by the frequency $f_{S2}$ of a second clock pulse which defines a final output timing of color signal. The first data output means is connected to the high-frequency signal emphasis means of the fifth aspect and the second data output means is connected to the color signal operation means of the fifth aspect. The frequency $f_{S2}$ of the second clock pulse is not zero and is one quarter the frequency $f_{S1}$ of the first clock pulse or less.

The signal processing device of the seventh aspect of the present invention relates to data thinning. According to the seventh aspect of the present invention, in the signal processing device of the sixth aspect, the second data output means outputs third color signals at a timing determined by one-n-ths (1/n: n is assumed any integer) of the frequency $f_{S2}$ of the second clock pulse according to a control signal which controls a division ratio used for dividing the frequency $f_{S2}$ of the second clock pulse so that the ratio in the amount of data to be outputted between the second color signals and the third color signals should be n:1. In other words, with respect to n data, (n−1) data are reduced.

According to the eighth aspect of the present invention, the signal processing device of either the sixth or seventh aspect further comprises: identification means for generating a first identifying signal to be outputted for identifying the combination of two signals (any of $U_1$ and $V_1$, $V_1$ and $W_1$, $W_1$ and $U_1$) out of three constituting the first color signals with respect to a specified pixel or a second identifying signal to be outputted for identifying the signal having an amplitude of zero among the three signals ($U_1$, $V_1$, $W_1$) two of which constitute the first color signals. The second luminance signal $Y_2$, the second color signals and the identifying signal (the first or second signal) are defined as a basic unit of output signals with respect to the specified pixel. Either the first data output means or the second data output means which is connected to the identification means outputs the identifying signal (the first or second identifying signal) together with the image data.

According to the ninth aspect of the present invention, the signal processing device of any of the sixth, seventh or eighth aspect further comprises: demodulator means for demodulating signals including at least the basic unit of signals consisting of the second luminance signal $Y_2$, the second color signals (two types) and the identifying signal (the first or second signal) with respect to the specified pixel outputted from the signal processing device of the eighth aspect into a component image signal to be outputted consisting of the luminance signal Y representing luminance component and the color difference signals (U, V, W) representing color component.

The signal processing method according to the first aspect of the present invention has a constitution for inputting the conventional component image signal consisting of the luminance signal Y and the color difference signals U, V, W and regenerating the first component image signal to be outputted which is adaptable to certain characteristics, which is based on the provision of the high-frequency signal emphasis step for the luminance component and the high-frequency signal cutoff step for color different component to be performed independently in parallel.

For example, considering the visual characteristics of the human eyes with respect to the luminance signal Y, a processing like high pass filtering (HPF) such as to transmit the high-frequency signal component more faithfully than the low-midrange frequency signal component is performed, while with respect to the color difference signals, a processing like low-frequency pass filtering (LPF) such as to transmit the low-midrange frequency signal component more faithfully is performed. These two processings are performed independently from and in parallel with each other, thus replacing the input component image signal with a signal which is adaptable to the visual characteristics of the human eyes or of the eyes of animals (e.g., a bee) other than human beings in the nature world.

Thus, it becomes possible to perform a signal processing such as to obtain an image signal from the inputted component image signal, which is adaptable to the visual characteristics of a variety of animals, e.g., small animals such as dog and bee, as well as human beings, by separating the luminance-signal system processing and the color-signal system processing. (For example, the signal processing method makes it possible for the human eyes to assure how this world is seen through the animals' eyes.)

Moreover, since the high-frequency signal cutoff step is performed in the initial stage of the color-signal system processing, it is possible to obtain a sampling frequency lower than ever in processing the sampling data from the outputted color signals into digital data.

The lost high-frequency signal component of the color signals in the high-frequency signal cutoff step is added to the luminance signal in the high-frequency signal emphasis step to adapt the luminance signal to the visual characteristics, and therefore, there is no loss in image quality of the reproduced image on the whole, which especially has a great effect on the image of nature.

The signal processing method according to the second aspect of the present invention, which further provides the first and second data output steps exclusively for the luminance-signal system processing and the color-signal system processing, respectively, enables a data output such as can not be carried out easily by the signal processing method of the first aspect. For example, the second luminance signal $Y_2$ can be transmitted by the first clock pulse $C_{K1}$ while the second color signals consisting of any two of $U_2$, $V_2$, $W_2$ can be transmitted by the second clock pulse $C_{K2}$ through the transmission lines (see FIG. 2A).

Moreover, the signal processing method of the second aspect can achieve a new component coding system of 4:0.5:0.5=8:1:1, 5:1:1 (≈4:0.8:0.8) or 9:1:1 from the conventional component coding system of 4:1:1, in which the data compression of the color signal is performed (see FIG. 2C showing partly).

As another function of the signal processing method of the second aspect of the present invention, it is possible to include the function to satisfy the characteristics of image apparatuses to which the image signal is connected. For example, when the second luminance signal $Y_2$ is connected to a digital frequency-modulator, pre-emphasis which is performed in frequency modulation (while de-emphasis is performed in frequency demodulation) may be included in the high-frequency signal emphasis step. This produces an effect of causing no loss in carrier-to-noise (C/N) ratio on the whole as well as cost effectiveness. Any method according to the present invention wherein the high-frequency signal component of the luminance-signal system is emphasized enjoys these effects.

The signal processing method according to the third aspect of the present invention, which comprises the color-signal system processing procedure consisting of the high-frequency signal cutoff step and color signal generation step and the luminance-signal system processing procedure consisting of the high-frequency signal emphasis step, is intended to adapt an image signal in particular to the visual characteristics of the human eyes, unlike the signal processing of the first and second aspects which is intended to adapt an image signal to the visual characteristics of not only the human eyes but the eyes of animals in the nature world. Three main functions of the third aspect are as follows.

The first function is to emphasize the pixels of the high-frequency signal component (edge pixels) in the colored portion of an image when the image is reproduced because of the high pass filtering (HPF) performed with respect to the luminance signal Y.

The second function is to achieve a good signal-to-noise (S/N) ratio of the color difference signals because of the low pass filtering (LPF) with replenishment of the low-midrange frequency signal component performed with respect to the color difference signals so as to transmit the low-midrange frequency signal component more faithfully.

The third function is to maintain a balance in brightness information between the input component signal and the output image signal on the whole because the color density signal S is added in the color signal operation step of the color-signal system processing while being subtracted in the high-frequency signal emphasis step of the luminance signal system processing.

When the reproduced image represented by the component image signal is seen through the human eyes as a physiological filter, it has almost flatness in image quality in the range of low-midrange to high frequency band, keeping naturalness. In particular, the emphasis of the edge in the colored portion of the image (by the high-frequency signal emphasis step) supplements the loss in image quality due to high-frequency signal cutoff of the color component.

In short, it is possible to achieve a signal processing method for generating the best component image signal of full color to the visual characteristics of the human eyes.

Instead of the color difference signals of conventional fixed pattern, U (=R−Y) and V(=B−Y), the color difference signals in a form of any combination of U and V(W=0), V and W(U=0), W and U(V=0) are outputted with respect to the specified pixel. The combination which responds to the change of the specified pixel is obtained. When the image is a still image, the combination of the color difference signals with respect to the specified pixel does not change in principle. Therefore, observing the combinations of the color difference signals with respect to a plurality of pixels allows easy judgment as to whether the image is a still image or a motion image. (In the background art, since the combination of the color difference signals is fixed, it is impossible to judge whether the image is a still image or a motion image in the same way.) In short, it is possible to achieve the signal processing method such as to produce the component image signal to easily judge whether the image is a still image or a motion image.

The signal processing method according to the fourth aspect of the present invention has a function of determining the amount of image data of the second color signals per unit of time and the amount of image data of the second luminance signal $Y_2$ per unit of time independently.

In particular, the second color signals of which the frequency bandwidth is low can be transmitted with low transmission rate. Specifically, the transmission rate of the second color signals is one quarter the transmission rate of the second luminance signal $Y_2$ or less. Thus, it is possible to transmit image data with the transmission rate which is lower as compared with the conventional component coding system of 4:1:1 or 4:2:0 (for MPEG).

Moreover, the signal processing method of the fourth aspect achieves the effects of reducing the transmission time for image transmission with e.g., color facsimile and of increasing the number of screens of image file to be stored into disk and the like. These effects are hard for the component coding system of 4:1:1 or 4:2:0 (for MPEG) to achieve.

In the signal processing device according to the fifth aspect of the present invention, the signal processing for the color component (especially, low pass filtering (LPF) and the color density signal operation) is performed independently from the signal processing for the luminance component.

With respect to the color-component system, the high-frequency signal component of the inputted color difference signals is cut off to generate low-frequency color difference signals so that the output component image signal should be adaptable to the visual characteristics of the human eyes that the resolution power to the color component is lower than the resolution power to the luminance component.

The first color signal, which is generated from the low-frequency color difference signals and the color density signal S of the low-midrange frequency signal component generated from the low-frequency color difference signals, is a signal in which the color density signal S is added to the low-midrange frequency signal component of the low-frequency color difference signals in terms of frequency. Therefore, the first color signals has LPF characteristics with replenishment of the low-midrange frequency signal component in terms of frequency characteristics.

With respect to the luminance-component system processing, the high-frequency signal emphasis means performs the operation in which the color density signal S of low-midrange frequency signal component is subtracted from the luminance signal Y having a wide-range frequency signal component, ranging from low-frequency to high-frequency. Accordingly, the low-midrange frequency signal component is omitted as compared with the high-frequency signal component in the luminance signal Y, and as the result, the high-frequency signal becomes higher in the level than the low-midrange-frequency signal. In short, the high pass filtering (HPF) is performed for the luminance signal Y. The high-frequency signal emphasis means has a function of emphasizing the edge of pixels in the colored portion of the image produced according to the component image signal.

At the same time, the high-frequency signal emphasis means has a function of maintaining a balance in brightness level between the input component image signal and the output image signal on the whole.

The function of maintaining the balance is achieved because the low-midrange frequency signal component which is subtracted in the luminance-component system processing is equal to the low-midrange frequency signal component which is added as the color density signal S in the color-component system processing.

The signal processing device in accordance with the fifth aspect of the present invention performs the same operation as the third aspect. Furthermore, in timesharing multiplex signal processing as a whole, additional effects can be achieved. First, the first delay means 27 is omitted by performing the LPF processing and thereafter the color density signal operation processing. Secondly, if the minimum value signal from which the color density signal S is obtained (the minimum value signal is the inverted data of the color density signal S in the sign) is inputted to the high-frequency signal emphasis means instead of the color density signal S while the color density signal S is inputted to the color density signal operation means, the high-frequency signal emphasis means and the color density signal operation means perform the same kind of operation (the addition operation) simultaneously and the delay made by the second delay means 28 is reduced. Thus, it is possible to perform the signal processing with very simple operation means.

In particular, it is possible to provide a desirable constitution for the signal processing with an image processor. The signal processing device in accordance with the sixth aspect of the present invention outputs the second luminance signal $Y_2$ by the frequency which is determined by the frequency $f_{S1}$ of the first clock pulse $C_{K1}$ and outputs the second color signals by the frequency which is determined by the frequency $f_{S2}$ of the first clock pulse $C_{K2}$.

The signal processing device in accordance with the sixth aspect of the present invention basically performs the same operation as the fourth aspect.

Furthermore, it is possible to provide a signal processing device which can be used for the component coding system of 5:1:1, 8:1:1 or 9:1:1 that is lower in transmission rate than the component coding system of 4:1:1 or 4:2:0 (for MPEG) by addition of a slight amount of memory.

The signal processing device in accordance with the seventh aspect of the present invention achieves thinning of the data to be outputted from the second data output means. Specifically, the signal processing device has a function of further reducing the number of data to be outputted from the second data output means per unit of time which depends on the component coding system (which is already reduced to some extent according to the component coding system) to its one-n-th (1/n).

Furthermore, as well as a simple data thinning by reducing the frequency $f_{S2}$ of the second clock pulse $C_{K2}$ to its half, the signal processing device of the seventh aspect has an effect of lowering the transmission rate with effectiveness and no difficulty by reducing the frequency $f_{S2}$ to its half in consideration of whether there in a change of the signal combination of the second color signals with respect to the specified pixel.

The signal processing device in accordance with the eighth aspect of the present invention outputs a basic unit of output signals with respect to the specified pixel, namely, signals consisting of the second luminance signal $Y_2$, the second color signals and the identifying signal (the first identifying signal or the second identifying signal) in a form of the basic unit of any combination of the signals from the first data output means or the second data output means which receives the output signal from the identification means.

With the identifying signal indicating the current combination of the second color signals of the component image signal outputted from the identification means 26, the receiving portion identifies the combination of the color difference signals. As a whole, the amount of the image data required in this case is about 82% as compared with the case where specific data are assigned to the three color difference signals individually with respect to each specified pixel.

In the signal processing device in accordance with the ninth aspect of the present invention, the demodulator means demodulates the basic unit of signals with respect to the specified pixel, namely, signals consisting of at least the second luminance signal $Y_2$, the second color signals and the identifying signal (the first identifying signal or the second identifying signal) outputted from the signal processing device of the eighth aspect into the component image signal to be outputted consisting of the luminance signal Y representing the luminance component and the color difference signals (three types of signals, U, V, W) representing the color component.

Thus, since demodulation of the component image signal outputted from the signal processing device of the present invention can be performed, it is possible to ensure data communication between the signal processing devices of the present invention.

After demodulation of the component image signal, the luminance signal Y is outputted from the output end for the luminance signal Y and the color difference signals U, V, W one of which has an amplitude of zero are outputted from the respective output ends independently. Therefore, compatibility in signal connection is ensured between the component image signal outputted from the demodulator means and conventional component image signal from other image apparatuses. In other words, it is possible to establish communication between the conventional component image signal and the signal processing device of the present invention.

The combination of demodulator means of the ninth aspect and the identification means of the eighth aspect produces a new effect. Specifically, the combination of the demodulator means and the identification means enables interactive transmission of the image information associated with image apparatuses used at home (home image apparatus, such as color television, VTR, color camera, LD, CR-ROM and image apparatus for amusement/game, and personal computer), namely, interactive television by using common data bus (e.g., home bus centered on the TV set at home, namely, home-multimedia bus) with transmission rate which is lower as compared with the conventional component coding system (4:1:1, 4:2:0), causing no loss in image quality.

As another effect produced by the combination of demodulator means of the ninth aspect and identification means of the eighth aspect, provision of the signal processing device including the two means for other conventional apparatuses further facilitates interactive transmission of information with other image apparatuses by using signals.

If a signal processing to display the first luminance signal $Y_1$ (or the second luminance signal $Y_2$) and the first color signals (or the second color signals) independently in a way adaptable to image devices (CRT, color liquid crystal display panel, color plasma display and CRT fiat-panel display) is performed in order to assure the result of the interactive transmission of the information as a display image which can be actually seen with the eyes, it is possible to provide an image display device which takes full advantage of the component image signal having a good affinity for a natural image. Thus, the signal processing device of the present invention has an effect on other image apparatuses, that is, produces a derivative effect.

An object of the present invention is to provide a signal processing method and device which can further reduce the transmission rate or the number of data per specified pixel (the amount of data) of the color difference signals than ever with respect to the transmission rate or the number of data per specified pixel (the amount of data) of the luminance signal while maintaining the image quality which might be obtained in the coding system of 4:1:1 of the background art.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3D shows a signal processing method in accordance with a third preferred embodiment of the present invention, and specifically a color density signal (S) generation step in accordance with the third preferred embodiment and a data output steps in accordance with a fourth preferred embodiment;

FIGS. 4A to 4D shows a connection between a signal processing device in accordance with a fifth preferred embodiment and various means associated therewith in accordance with sixth, seventh and eighth preferred embodiments;

FIGS. 7A and 7B show examples of various parameters of component image signal in the coding system of 4:2:2 and HDTV, respectively, in the background art.

DESCRIPTION OF THE PREFERRED EMBODIMENTS

Figure 1:
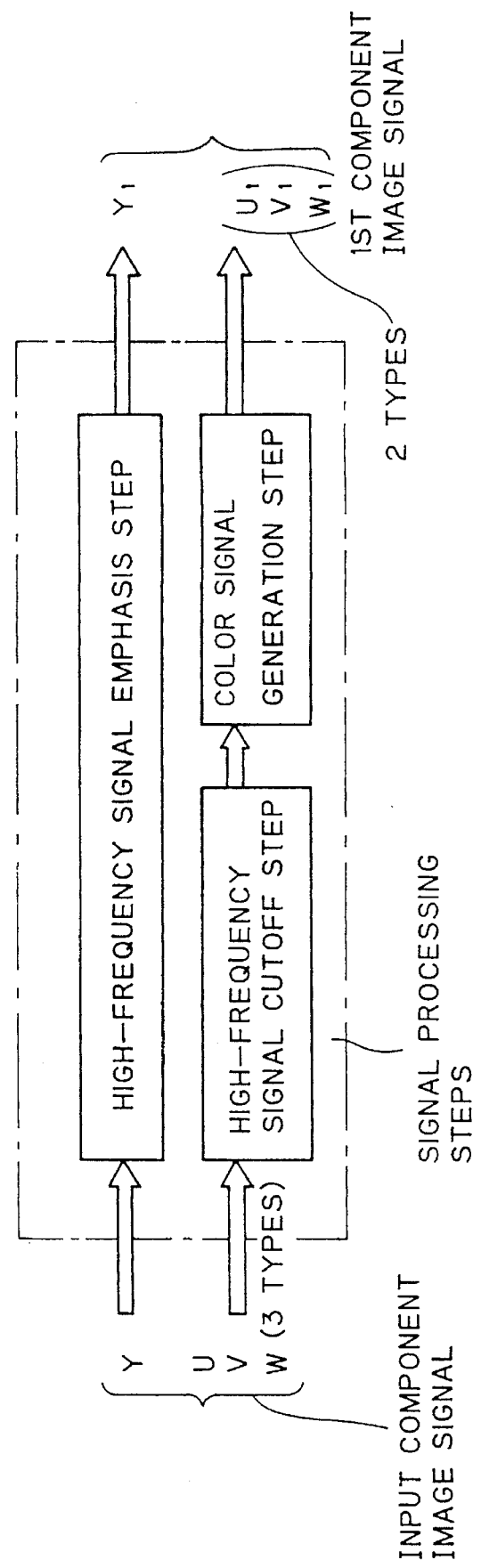
FIG. 1 shows a signal processing method in accordance with a first preferred embodiment of the present invention.

The First Preferred Embodiment:

FIG. 1 shows a signal processing method in accordance with the first preferred embodiment of the present invention. In the signal processing method of the first preferred embodiment, from an input component image signal consisting of a luminance signal Y representing the luminance component and color difference signals U, V, W representing the color component, the first component image signal consisting of the first luminance signal $Y_1$ representing the luminance component and the first color signals (which consists of any two out of $U_1$, $V_1$, $W_1$) representing the color component which includes only the color component is generated and then outputted. Furthermore, the information regarding the color component may be represented by any combination of $U_1$ and $V_1$, $V_1$ and $W_1$ or $W_1$ and $U_1$.

In the background-art signal processing method of this type, a standardized filtering processing, a conversion of coding system (e.g., 4:4:4:→4:2:2→4:1:1 or 4:4:4→4:2:0 ... an example of the formats adopted for MPEG2) or the like has been performed with respect to the luminance signal Y and color difference signals U, V. On the other hand, in the signal processing method of the present invention, a signal processing such as to adapt the luminance signal Y and color difference signals to certain characteristics (a variety of visual characteristics of human eyes or animals' eyes) is performed.

As a color-signal system processing, the color difference signals representing the color component is first lowered in terms of frequency by cutting off the high-frequency signal component thereof at the cut-off frequency such that the color difference signals should be adaptable to the subject (living creature) in a high-frequency signal cutoff step. The low-frequency color difference signals which is lowered in terms of frequency are processed in a color signal generation step to output a new color signals $U_1$, $V_1$, $W_1$ representing only the color component.

As a luminance-signal system processing, the high-frequency signal component of the luminance signal Y is emphasized in a high-frequency signal emphasis step to generate the first luminance signal $Y_1$ having new frequency characteristics, to be outputted.

The color-signal system processing and the luminance-signal system processing constitute the signal processing of the present invention.

Furthermore, it is preferable to perform synchronously in parallel the luminance-signal system processing including the high-frequency signal emphasis step and the color-signal system processing including the high-frequency signal cut-off step and the color signal generation step which are carried out in concatenation.

In particular, since the color-signal system processing includes the high-frequency signal cutoff step in which the high-frequency signal of the color-signal system is cut off, it is possible to perform sampling or resampling of the first color signals $U_1$, $V_1$, $W_1$ with low sampling frequency, and to reduce the transmission rate.

Assuming that the input/output signals are analog and the whole signal processing is performed as an analog processing, it would become possible to realize frequency division multiplexing of e.g., a still image information-bearing signal and other signals in the frequency band above the cut-off frequency of the first color signal.

In particular, more desirably, the frequency division multiplex of the frequency component of a voice information-bearing signal which is frequency modulated by a specific carrier in the frequency band above the cut-off frequency of the first color signal might provide a signal processing and transmission method which is adaptable to a transmission line applicable to home-multimedia including provisions for the multimedia.

Assuming that the input/output signals are digital and the whole signal processing is performed as a digital processing, it would become possible to further transmit other digital information without changing the transmission rate. For example, simultaneous convolution of address information of the transmission target, security information, or cipher information associated with the home-multimedia on the transmission line of the first color signal can be achieved.

Figure 2A:
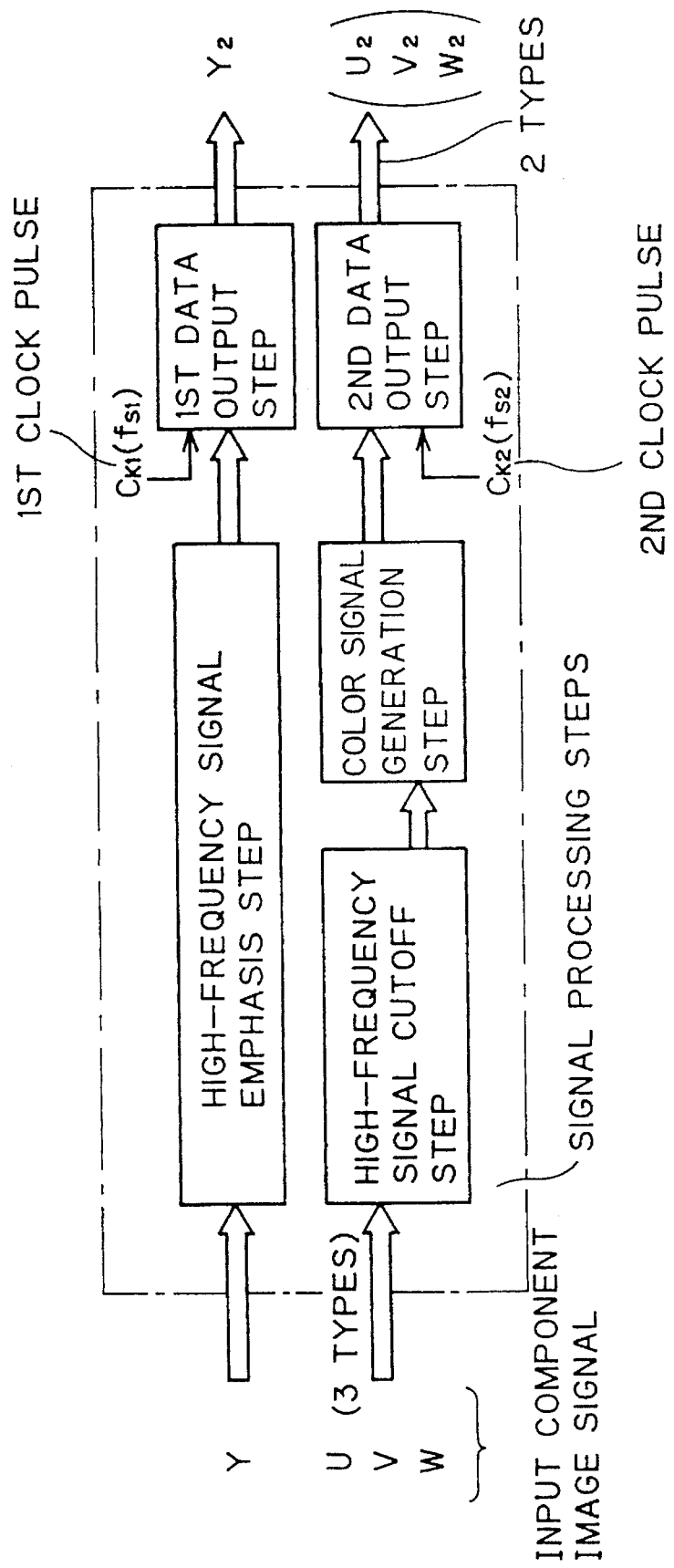
FIG. 2A shows a signal processing method in accordance with a second preferred embodiment of the present invention.

The Second Preferred Embodiment:

FIG. 2A shows a signal processing method in accordance with the second preferred embodiment of the present invention. In the signal processing method of the second preferred embodiment, the second luminance signal $Y_2$ and the second color signals $U_2$, $V_2$, $W_2$ are generated from the first component image signal of the first preferred embodiment and then outputted through the first data output step and the second data output step, respectively. Furthermore, the information regarding color component may be represented by any combination of $U_2$ and $V_2$, $V_2$ and $W_2$ or $W_2$ and $U_2$, as discussed in the first preferred embodiment.

In the process of the second preferred embodiment, the first data output step and the second data output step follow the luminance-signal system processing and the color-signal system processing of the first preferred embodiment, respectively. In the first data output step, the second luminance signal $Y_2$ representing the luminance component which is obtained from the first luminance signal $Y_1$ is outputted at a timing determined by the frequency $f_{S1}$ of the first clock pulse which defines the final output timing of luminance signal.

In the second data output step, the second color signals consisting of any two of $U_2$, $V_2$, $W_2$ representing the color component which are obtained from the first color signals consisting of any two of $U_1$, $V_1$, $W_1$ are outputted at a timing determined by the frequency $f_{S2}$ of the second clock pulse which defines the final output timing of color signals.

Figure 2B:
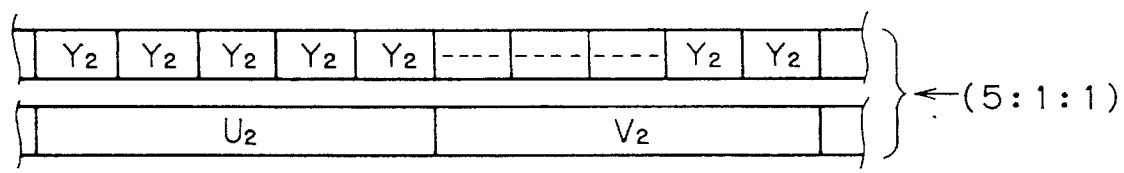
FIGS. 2B and 2C show pixel structures of coding systems in accordance with a second and third preferred embodiment of the present invention.

Moreover, it may be possible to perform signal transmission with a coding system of 4:4/5:4/5=4:0.8:0.8=5:1:1 which is a little lower in the amount of data or transmission rate than the coding system of 4:1:1, where the second luminance signal $Y_2$ is transmitted through a transmission line and the second color signals consisting of any two signals of $U_2$, $V_2$, $W_2$ are transmitted through another transmission line in a data train as shown in FIG. 2B. The coding system is lower in the amount of data or transmission rate than the coding system of 4:1:1 in the background art.

Figure 2C:
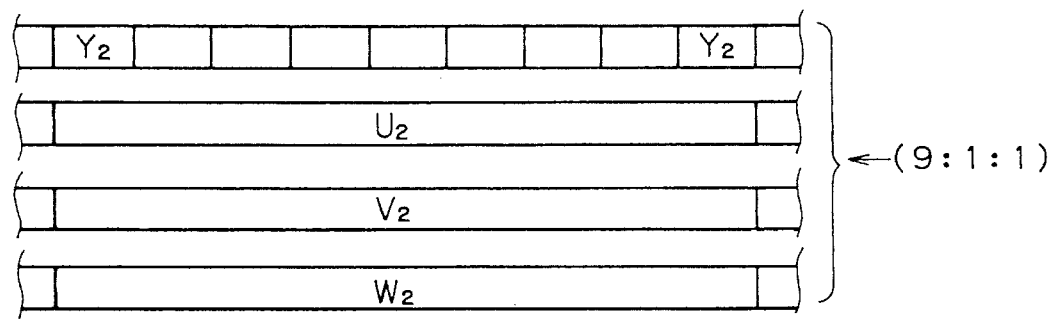

It may be also possible to perform signal transmission with a coding system of 9:1:1. For example, assuming that the cut-off frequency used for the high-frequency signal cutoff step is 0.75 MHz and the frequency $f_{S1}$ of the first clock pulse $C_{K1}$ is 13.5 MHz, the frequency $f_{S2}$ of the second clock pulse $C_{K2}$ can be 1.5 MHz (according to the well-known sampling theorem), which is one-ninth of the frequency $f_{S1}$ of the first clock pulse $C_{K1}$. This is a coding system of Y:U:V=Y:V:W=Y:W:U=9:1:1 (see FIG. 2C). The first reason to support the coding system of 4:0.8:0.8 or 9:1:1 lies in the high-frequency signal cutoff step of the color-signal system processing.

In the background, there is a fact that the frequency bandwidth of signals other than I signal, i.e., B–Y, R–Y, G–Y and Q signal, is approximately 0.5 MHz and that of I signal is 1.3 to 1.5 MHz in the normal NTSC system.

With the concept of the signal processing method of the present invention that the high-frequency signal of the color component is cut off, or rather, is used for emphasis of the high-frequency signal of the luminance signal component to give an image with flatness in quality on the whole to the human eyes through the visual filter (physiological filter), there is no objection about the cut-off frequency being assumed 0.75 MHz as above from the Shannon's sampling theorem. This is the second reason to support the coding system of 4:0.8:0.8 or 9:1:1. (In the background art, the emphasis of the luminance signal with respect to the colored portion of an image is neglected, and accordingly, careless cutoff of the high-frequency signal of the color component causes loss in image quality.) Thus, the component coding system of 9:1:1 can be employed, and as a matter of course, the component coding system of 8:1:1 which transmits more amount of data can be also employed.

Since the high-frequency signal emphasis step is performed in the luminance-signal system processing, when the transmission is frequency modulated, a pre-emphasis function which is necessary for FM transmission (in order to reduce the triangular noise) is usefully included in the high-frequency signal emphasis step. This allows a desirable application in image transmission of the screen of a digital portable telephone in multimedia.

The Third Preferred Embodiment:

FIG. 3A shows a signal processing method in accordance with the third preferred embodiment. The third preferred embodiment is directed to a signal processing method such as to adapt an image signal more specifically to the visual characteristics of the human eyes.

Now, the signal processing method of the third preferred embodiment will be discussed. As to the color-signal system processing, the first color signals representing the color component including only the color component are generated from the input color difference signals U, V, W and then outputted. Furthermore, in contrast to the conventional component image signal consisting of the fixed pattern of the luminance signal Y and the color difference signals of U(=R–Y) and V(=B–Y), the color difference signals of the component signal of the third preferred embodiment may be formed of any combination of U and V, V and W, or W and U, i.e., any of (R–Y) and (B–Y), (B–Y) and (G–Y), or (G–Y) and (R–Y) with respect to the specified pixel. The discussion thereof will be presented below.

The color-signal system processing is performed as follows. The high-frequency signal component of the three color difference signals U(=R–Y), V(=B–Y) and W(=G–Y) of the input component image signal is cut off in a high-frequency signal cutoff step 5 to output low-frequency color difference signals L(U), L(V), L(W). The low-frequency color difference signals are inputted to a color density signal operation step 11 where the minimum value signal (inclusive of sign) among the low-frequency color difference signals is inverted in sign to obtain a color density signal S.

Figure 3C:
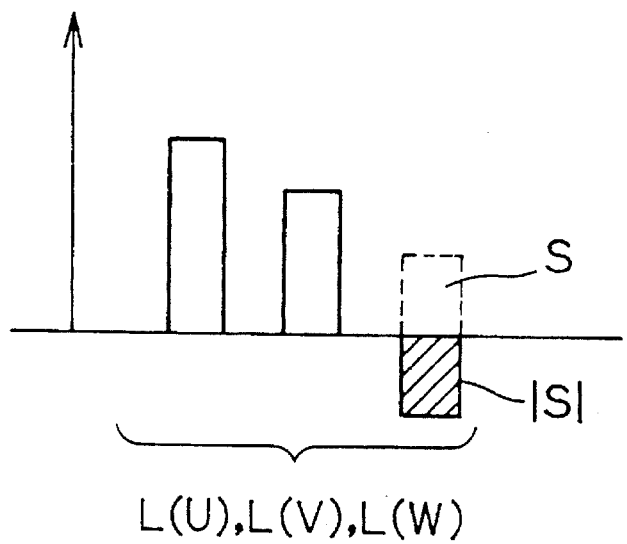
Figure 3D:
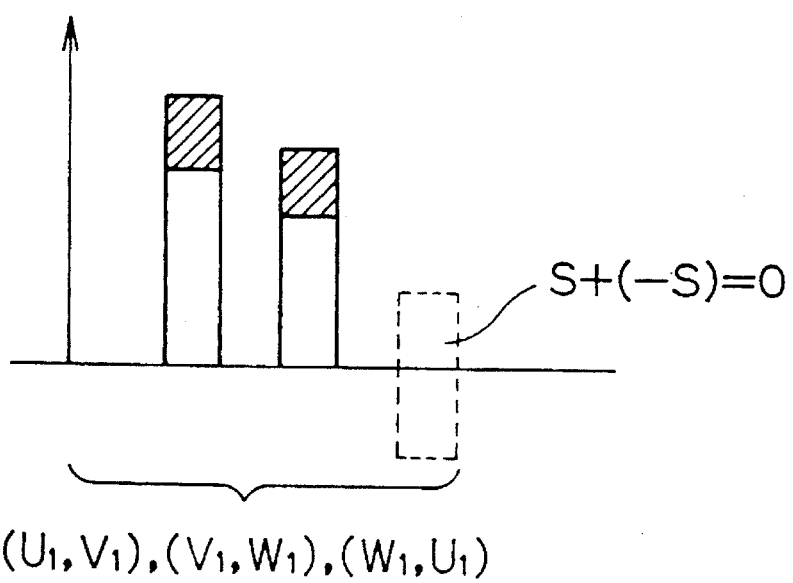

After that, in a color signal operation step 12, an operation using the low-frequency color difference signals L(U), L(V), L(W) and the color density signal S is performed to output the first color signal formed of any combination of $U_1$ and $V_1$, $V_1$ and $W_1$, $W_1$ and $U_1$. The color density operation step 11 and the color signal operation step 12 constitute a color signal generation step. FIGS. 3C and 3D show signal models in the process of generating the color signals from the low-frequency color difference signals. The minimum value signal inclusive of sign among the low-frequency color difference signals L(U), L(V), L(W) is the right signal indicated by the shaded portion of FIG. 3C, and an inverted signal of the minimum value signal is the color density signal S indicated by the dotted line. The color density signal S is added to each of the rest of the low-frequency color difference signals as shown in FIG. 3D.

The combination of signals constituting the first color signals to be outputted after being processed in the color signal operation step changes in response to the change of the specified pixel data every moment. In other words, the color information captured evenly from RGB components of the specified pixel is outputted, and therefore, the information of natural image is outputted.

In terms of frequency, low pass filtering (LPF) with replenishment of the low-midrange frequency band component such as to transmit low-midrange frequency signal component more faithfully is performed in the color-signal system processing. This results from the operation in which the color density signal S is added to the low-frequency color difference signals L(U), L(V), L(W) (the outputs from the high-frequency signal cutoff step 5) to output the first color signals ($U_1$, $V_1$, $W_1$). Since the high-frequency signal component of the color density signal S is cut off, the low-midrange frequency signal component in the color-component system increases by the color density signal S. That is clearly seen from FIGS. 3C and 3D.

In the luminance-signal system processing, the color density signal S of low-midrange frequency signal component is subtracted from the luminance signal Y of wide-range frequency (from low- to high-frequency) signal component, and as the result, the level of the high-frequency signal component becomes greater as compared with the low-midrange frequency signal component, thus achieving emphasis of the high-frequency signal component.

The feature of the signal processing method of the third preferred embodiment lies in a specific signal processing with respect to the luminance signal Y performed in the luminance-signal system processing so that the luminance signal Y should be adaptable more particularly to the visual characteristics of the human eyes. Specifically, the low-midrange frequency signal component of the luminance signal Y is subtracted by the color density signal S while the high-frequency signal of the luminance signal Y is not reduced. Thus, so to speak, a high pass filtering is performed, thereby emphasizing the high-frequency signal component in the colored portion of the produced image. As mentioned above, this result from the high-frequency signal emphasis step in which the color density signal S is subtracted from the luminance signal Y.

There may be a case where the first and second delay steps are needed in the luminance-signal system processing as shown in FIG. 3A. These steps are needed in order to obtain the same final output timing both in the color-signal system processing and luminance-signal system processing because the color-signal system processing requires more steps than the luminance-signal system processing.

As an effect of the interaction between the high-frequency signal emphasis step and the color signal operation step, the brightness information of the input component image signal (Y and U, V, W) can be passed to the first component image signal ($Y_1$ and any combination of $U_1$ and $V_1$, $V_1$ and $W_1$, $W_1$ and $U_1$) newly generated according to the signal processing method without loss on the whole. In short, the interaction has the effect of maintaining a balance in the level of brightness between the input and output component image signals.

Specifically, the low-midrange frequency signal component lost during the high-frequency signal emphasis step is added by the color density signal S in the color signal generation step, resulting in replenishment. In other words, the color density signal S serves as an intervening signal to keep a balance of brightness between the luminance-signal system processing and the color-signal system processing.

The Fourth Preferred Embodiment:

FIG. 3B shows a signal processing method in accordance with the fourth preferred embodiment of the present invention where the first and second data output steps 23, 25 are connected to the processing steps of the third preferred embodiment. The basic operation of the signal processing method of the fourth preferred embodiment is the same as that of the third preferred embodiment. The additional processing steps are the same as the steps discussed in the second preferred embodiment. In the fourth preferred embodiment, however, the final output data are obviously digital and the amount of data associated with the color-component system can be further reduced because the signal processing method is intended to adapt an image signal more specifically to the visual characteristics of the human eyes unlike the second preferred embodiment.

Specifically, the frequency $f_{S2}$ of the second clock pulse $C_{K2}$ used in the second data output step 25 to output the second color signals is set to one-fourth the frequency $f_{S1}$ of the first clock pulse $C_{K1}$ or less, thereby reducing the whole amount of data of the color signals and lowering the ratio of the transmission rates to 4:1:1 or 4:2:0 or less. In other words, the signal processing method of the fourth preferred embodiment allows the transmission rate of the color component to be one-fourth or less the transmission rate of the luminance component in the signals not to make so much fine image quality associated with home-multimedia centered on a TV set and the image transmission using telephone line which utilizes the home-multimedia and in the image signals of MPEG (Moving-Picture Image Coding Expert Group) where data compression technique is employed by improving the time redundancy, redundancy in distribution of frequency component of pixels or assignments of sign.

This results from the high-frequency signal cutoff step performed prior to the color generation step in the color-component system processing, where the high-frequency signal of the color component is cut off, and the signal processing step such as to adapt the component image signal more specifically to the visual characteristics of the human eyes.

Moreover, the second clock pulse $C_{K2}$ may be variably controlled by a control signal 30 bearing motion information in response to the input component image signal, to thereby reduce the amount of data of the second color signals to be outputted. If the frequency $f_{S2}$ of the second clock pulse $C_{K2}$ is changed in response to the motion of the image so that, for example, the second color signals should be outputted by $f_{S2}$ when the motion is great and otherwise outputted by one-third of $f_{S2}$, the loss in image quality can be reduced as compared with a simple change of the frequency $f_{S2}$ to one-third of $f_{S2}$.

Thus, the signal processing method of the fourth preferred embodiment enables reduction in the amount of various data by utilizing well the visual characteristics of the human eyes and achieves an affinity for the image data produced by other image apparatus in the same manner. This results from the feature of the signal processing method of the fourth preferred embodiment which, in particular, takes the visual characteristics of the human eyes into consideration.

As a result, the signal processing method of the fourth preferred embodiment, which can achieve reduction in transmission time for image transmission in apparatus associated with image data directed toward the human eyes, such as color facsimile, and increase in the number of screens of image file to be stored into disk and the like, will have a great economical effect on the new upgrade of infrastructure to be expected in the future.

The Fifth Preferred Embodiment:

FIG. 4A shows a signal processing device in accordance with the fifth preferred embodiment of the present invention. In FIG. 4A, the steps of FIG. 3A are replaced with identical means, so elements having like function in these figures are given the same reference numeral. The basic constitution of the signal processing device is achieved by replacing the steps of FIG. 3A with the identical means. Accordingly, detailed discussion thereof will be omitted.

In order to avoid the use of the first delay means 27, considering that the color-signal system processing needs much operation time than the luminance-signal system processing, the delay time made by the first delay means 27 is assigned to the operation time required for high-frequency signal cutoff means 5 and color density signal operation means 11, thereby ensuring smooth flow of signals in the processing.

Although the processing performed by high-frequency emphasis means 6 (subtraction) appears to be different from the processing performed by the color signal operation means 12 (addition), an addition operation may be performed by the high-frequency emphasis means 6 if an inverted signal of the color density signal S in the sign (in fact, the sign-inverted signal of the color density signal S is the minimum value signal among the low-frequency color difference signals L(U), L(V) and L(W)) is inputted to a negative input of the high-frequency emphasis means 6. In other words, the high-frequency emphasis means 6 and the color signal operation means 12 can employ the same hardware, and accordingly, perform the processings almost simultaneously (perform these addition operations alternately every a prescribed processing). From the viewpoint of hardware, the high-frequency emphasis means 6 and the color signal operation means 12 can be incorporated, and the second delay means 28 has to only perform a delay processing in a unit of a few clocks (1 instruction or a few instructions).

Figure 4C:
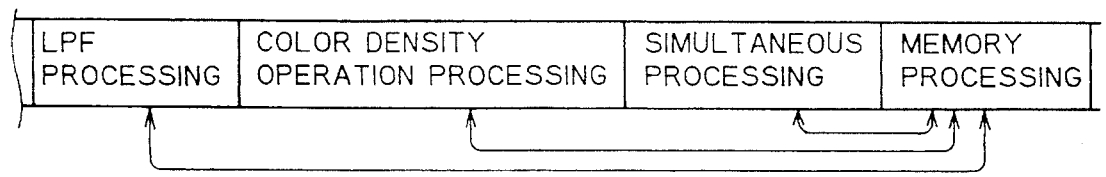

Applying timesharing to the above concept, it is possible to achieve such timesharing as shown in FIG. 4C. Therefore, according to the signal processing means of the fifth preferred embodiment, an efficient constitution can be achieved.

The simultaneous processing (6 and 11) of FIG. 4C indicates a simultaneous processing performed by the high-frequency emphasis means 6 and the color density operation means 11 as discussed above. Thus, the fifth preferred embodiment does not simply replace the steps of the third preferred embodiment with identical means, but have an effect of improving throughput (flow) of signals, which can be achieved only by the constitution of the present invention.

The Sixth Preferred Embodiment:

FIG. 4B shows a constitution in accordance with the sixth preferred embodiment of the present invention, which are connected to the constitution of FIG. 4A in concatenation. In FIG. 4B, the steps of FIG. 3B are replaced with identical means, so elements having like function in these figures are given the same reference numeral. The sixth preferred embodiment shows an invention which is directed to a signal processing device, taking the fourth preferred embodiment from another point of view. The basic operation is the same as discussed in the fourth preferred embodiment, so discussion thereof will be omitted.

Furthermore, due to being a device, the first and second clock pulses $C_{K1}$ and $C_{K2}$ should be those which are in synchronization with a master clock supporting the operation of the signal processing means, and the luminance signal and color signals should be outputted in a form of basic unit per unit of time, as shown in FIGS. 2B and 2C and FIGS. 6A to 6C.

Accordingly, for example, by providing another memory processing means as shown in FIG. 4C in parallel, the first and second data output means 23 and 25 have access to the two memories synchronously by the first and second clock pulses $C_{K1}$ and $C_{K2}$. To achieve the constitution of the sixth preferred embodiment, only one memory has to be added to the constitution of the fifth preferred embodiment. Moreover, the additional signal processing means of the sixth preferred embodiment allows the coding system of 8:1:1 or 9:1:1 which needs less amount of data than the coding system of 4:1:1 or 4:2:0 (for MPEG) as discussed earlier, so that desirably only about 11% to 12.5% of the memory for the luminance signal is needed for the memory for the color signal.

The Seventh Preferred Embodiment:

The seventh preferred embodiment is directed a signal processing device which enables further reduction in the amount of the second color signals (the amount of data to be generated per unit of time) which depends on the component coding system, according to the outside circumstances.

For example, in the coding system of 5:1:1 as discussed in the second preferred embodiment, when the second clock pulse used for outputting the second color signals is changed to its half, the ratio in the amounts of data of the luminance signal to the color signals becomes apparently 10:1:1.

That is, using the component coding system of 5:1:1 with half the second clock pulse results in apparently adopting the component coding system of 10:1:1 in terms of the transmission rate.

In the above discussion, reducing the second clock pulse to its half allows half of the image information to leave out. Obviously, however, a receiving unit can reproduce the image through a signal processing such as interpolation in which the left-out image information is interpolated by mean value interpolation.

Thus, the above example of using half the second clock pulse enables further reduction in the transmission rate of the color component which depends on the component coding system. In home-multimedia centered on a television, advantageously a receiving unit can respond to the received data by the interpolation which is easier as compared with the background arts (MUSE) at a low cost. In particular, if the control signal 30 is generated when there is no change in the combination of the color difference signals with respect to the specified pixels for a prescribed time, defining the image as a still image, and the frequency $f_{S2}$ of the second clock pulse $C_{K2}$ is changed to its half according to the control signal 30, the effect of the seventh preferred embodiment can be achieved without loss in image quality. Thus, it is possible to recognize whether the image is a still image or a motion image by whether or not there is a change of the combination of the color difference signals. That results from the characteristic feature in the output of the color signals according to the signal processing of the present invention.

The Eighth Preferred Embodiment:

FIG. 4A shows identification means 26 which is additionally provided in the rearward position of this figure.

Figure 4D:
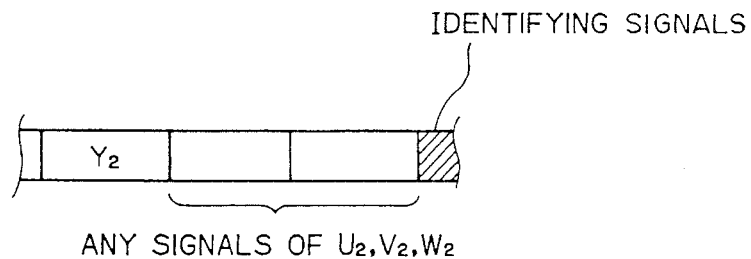

In the signal processing device of the eight preferred embodiment, the combination of the identification means 26 and the first and second data output means 23 and 25 enables a basic unit of signals to be outputted from the first and second data output means 23 and 25. The basic unit is formed of the first luminance signal, the first color signals consisting of two types of signals and an identifying signal (either the first identifying sign for identifying the combination of the signals having an amplitude of not zero to constitute the color signals or the second identifying sign for identifying the signal having an amplitude of zero) of, e.g., 2 bits outputted from the identification means 26 via identifying signal path 20, as shown in FIG. 4D.

The eighth preferred embodiment achieves a constitution in which the first data output device or the second data output device outputs the luminance signal Y, color signals (two types) and identifying signal of, e.g., 8 bits, 8 bits×2 and 2 bits, respectively, i.e., signals of 26 bits in total per unit of pixel.

Although the data of 26 bits per unit of pixel is larger than the conventional data consisting of the luminance signal Y and the color difference signals U, V having 24 bits per unit of pixel by 2 bits, it is possible to demodulate the 26-bit signal data into 32-bit signal data including the luminance signal Y and all the color difference signals U, V, W.

Specifically, referring to the identifying signal, the color difference signals U, V, W are obviously reproduced by using Formulae (1), (2) and (3) shown earlier. Thus, the signal processing device of the eighth preferred embodiment can output the data of 26 bits per unit of pixel which have the same function as the data of 32 bits per unit of pixel.

Figure 5:
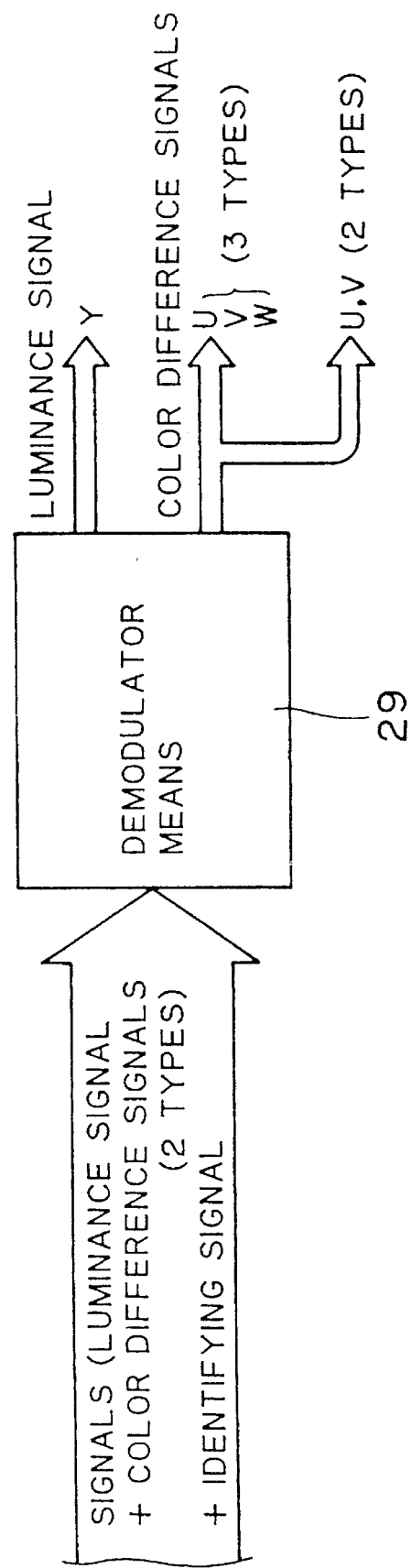
FIG. 5 shows demodulator means in accordance with a ninth preferred embodiment.
Figure 6A:
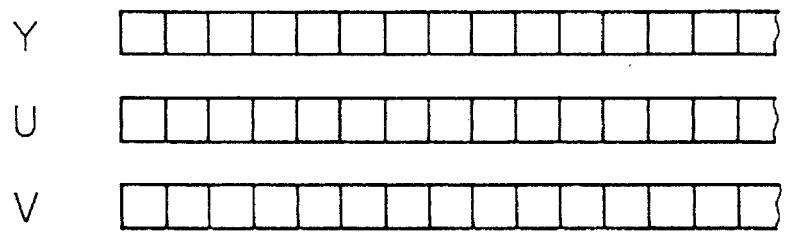
FIGS. 6A to 6C show models of pixel structure in the respective coding systems of component image signal.
Figure 6B:
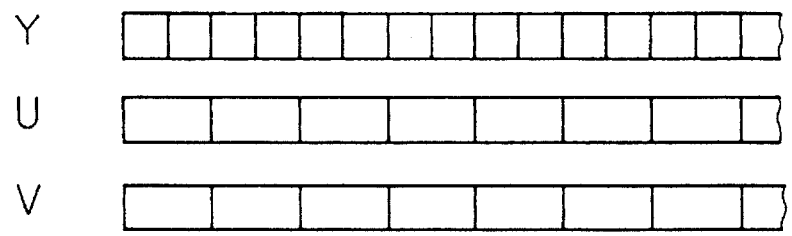
Figure 6C:
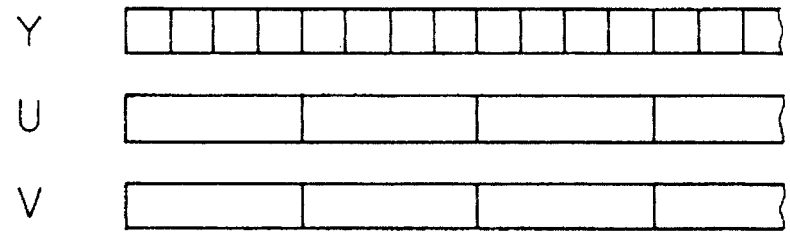
Figure 6D:
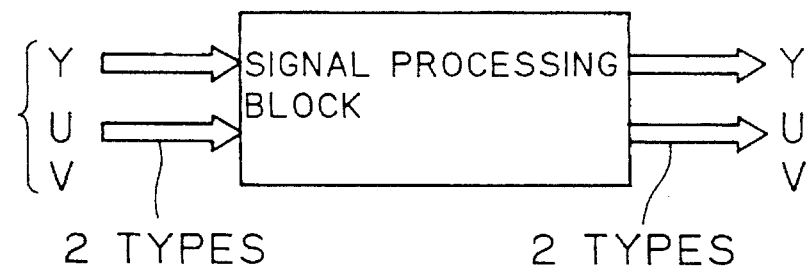
FIG. 6D shows a signal processing block in the background art.

The Ninth Preferred Embodiment:

FIG. 5 shows a signal processing apparatus in accordance with the ninth preferred embodiment of the present invention. The signal processing device of the ninth preferred embodiment comprises demodulator means 29 which demodulates the basic unit of signals including at least the second luminance signal $Y_2$ representing the luminance component, the second color signals representing the color component and the identifying signal (either the first identifying sign or the second identifying sign) which is outputted from the identification means of the eighth preferred embodiment into the component image signal to be outputted consisting of the luminance signal Y and the three color difference signals U, V, W.

The demodulator means 29 of FIG. 5 identifies first the combination of the two color signals, $U_2$ and $V_2$, $V_2$ and $W_2$, or $W_2$ and $U_2$, with respect to the current specified pixel by the received identifying signal (the first or second identifying sign).

Based on the identification result, the color signals $U_2$, $V_2$, $W_2$ are outputted to output lines corresponding to U, V, W, respectively. For example, if the combination of $U_2$ and $V_2$ is identified as the second color signals, the demodulator means 29 outputs the color signals $U_2$, $V_2$ and a signal representing zero to the output lines corresponding to U, V and W, respectively. Also the demodulator means 29 outputs the second luminance signal $Y_2$ to the output line corresponding to Y. Obviously, instead of the three color difference signals U, V and W, the combination of the two color difference signals U and V is obtained by using Formulae (1), (2) and (3) (shown in FIG. 5).

The demodulator means 29 can receive the signals synchronously as the basic unit. That is achieved by the well-known synchronous receiving technique in the background arts, so the discussion thereof will be omitted. When the component image signal outputted from the demodulator means 29 is inputted to, e.g., any signal processing device of the fifth, sixth, seventh or eighth preferred embodiment, the signal processing as discussed is performed. Furthermore, although the color density signal S is always zero through the signal processing because the minimum value signal is zero, there arises no drawback for the signal processing.

As a matter of course, it is possible to easily provide means for outputting the signals immediately when the color signal S is zero. In short, the demodulator means 29 has only a function of dividing the signals constituting the component image signal through a synchronous processing (software or hardware processing) according to the clock information other than the basic signals which is included in the received signals.

The ninth preferred embodiment does not need so much cost, and accordingly, a processing by software is preferable.

The signal processing device of the ninth preferred embodiment with the demodulator means 29 makes it possible to receive the component image signal outputted from the signal processing device of the eighth preferred embodiment with the identification means 26.

A signal processing device comprising both the identification means 26 and the demodulator means 29 enables interactive image information transfer with the component image signal between signal processing devices. Moreover, a new component coding system of the component image signal of e.g., 8:1:1, 5:1:1 or 9:1:1 can be achieved, being lowered in transmission rate than the component coding system of e.g., 4:1:1 or 4:2:0 (for MPEG) in the background arts, because the high-frequency signal component of the signals representing the color component is cut off as shown earlier in the discussion of the inside constitution of the signal processing device of the present invention.

An image apparatus (such as a color TV set, a VTR, a color camera, an LD, a CD-ROM player and image apparatus for amusement/game), which comprises the first signal processing device including either the demodulator means 29 or the identification means 26, or the second signal processing device including both the demodulator means 29 and the identification means 26 enables an interactive image information transfer with the component image signal, i.e., interactive television, through a common data bus.

Moreover, the image apparatus can achieve the interactive image information transfer with a transmission rate which is lower as compared with the transmission rate in the conventional component coding system (4:1:1 or 4:2:0).

While the invention has been shown and described in detail, the foregoing description is in all aspects illustrative and not restrictive. It is therefore understood that numerous modifications and variations can be devised without departing the scope of the invention.

We claim:

1. A signal processing method, for inputting an input component image signal having a luminance signal representing a luminance component and color difference signals representing a color component and generating a first component image signal to be outputted having a first luminance signal representing the luminance component and first color signals representing the color component, comprising the steps of:

emphasizing a high-frequency signal component of said luminance signal to output said first luminance signal;

cutting off a high-frequency signal component of said color difference signals to output low-frequency color difference signals; and generating said first color signals from said low-frequency color difference signals to be outputted, wherein said step of generating said first color signals follows said step of cutting off said high-frequency signal component, and said step of emphasizing said high-frequency signal component and said step of cutting off said high-frequency signal component being performed substantially in parallel.

2. The signal processing method of claim 1, further comprising:
   a first step of outputting a second luminance signal representing the luminance component generated from said first luminance signal at a timing determined by the frequency of a first clock pulse which defines a final output timing of the luminance signal; and
   a second step of outputting second color signals representing the color component generated from said first color signals at a timing determined by the frequency of a second clock pulse which defines a final output timing of the color signal, wherein
   said first step and said second step are performed in parallel.

3. A signal processing method, for inputting an input component image signal having a luminance signal representing a luminance component and color difference signals representing a color component and generating a first component image signal to be outputted having a first luminance signal representing the luminance component and first color signals representing the color component, comprising:
   a color signal system processing procedure including,
      cutting off a high-frequency signal component of said color difference signals to output low-frequency color difference signals, and subsequently generating color signals by,
      performing a color density signal operation in which a minimum value signal having a minimum value among said low-frequency color difference signals is inverted in polarity to output a color density signal, and
      performing a color signal operation in which said color density signal is added to said low-frequency color difference signals to output said first color signal; and
   a luminance-signal system processing procedure including,
      emphasizing a high-frequency signal component of said luminance signal through an operation in which said color density signal is subtracted from said luminance signal to output said first luminance signal; wherein said color-signal system processing procedure and said luminance-signal system processing procedure are performed almost in parallel.

4. The signal processing method of claim 3, further comprising:
   a first step of outputting a second luminance signal representing the luminance component generated from said first luminance signal at a timing determined by the frequency of a first clock pulse which defines a final output timing of the luminance signal; and
   a second step of outputting second color signals representing the color component generated from said first color signals at a timing determined by the frequency of a second clock pulse which defines a final output timing of the color signal, wherein
   said first step is performed after said step of emphasizing said high-frequency signal component and said second step is performed after said step of performing said color signal operation, and
   the frequency of said second clock pulse is not zero and is one quarter the frequency of said first clock pulse or less.

5. A signal processing device, for inputting an input component image signal having a luminance signal representing a luminance component and color difference signals representing a color component and generating a first component image signal to be outputted having a first luminance signal representing the luminance component and first color signals representing the color component, comprising: high-frequency signal cutoff means for cutting off a high-frequency signal component of said color difference signals to output low-frequency color difference signals;
   color signal generating means for generating said first color signals from said low-frequency color difference signals to be outputted; and
   high-frequency signal emphasis means for emphasizing a high-frequency signal component of said luminance signal to output said first luminance signal,
   said color signal generating means including,
      color density signal operation means for performing an operation in which a minimum value signal having a minimum value among said low-frequency color difference signals is inverted in polarity to output a color density signal, and
      color signal operation means for performing an operation in which said color density signal is added to said low-frequency color difference signals to output said first color signals;
   said high-frequency signal emphasis means including;
      operation means for performing an operation in which said color density signal is subtracted from said luminance signal, and
   a signal processing with respect to the color component is performed by said high-frequency cutoff means and said color signal generating means, and a signal processing with respect to the luminance component is performed by said high-frequency signal emphasis means.

6. The signal processing device of claim 5, further comprising:
   first data output means for outputting a second luminance signal representing the luminance component generated from said first luminance signal at a timing determined by the frequency of a first clock pulse which defines a final output timing of luminance signal; and
   second data output means for outputting second color signals representing the color component generated from said first color signals at a timing determined by the frequency of a second clock pulse which defines a final output timing of color signal;
   said first data output means being connected to said high-frequency signal emphasis means and said second data output means being connected to said color signal operation means, and
   the frequency of said second clock pulse is not zero and is one quarter the frequency of said first clock pulse or less.

7. The signal processing device of claim 6, wherein
   said second data output means outputs third color signals at a timing determined by one-n-th (1/n: n is any integer) of the frequency of said second clock pulse according to a control signal which controls a division ratio used for dividing the frequency of said second clock pulse so that the ratio in the amount of data to be outputted between said second color signals and said third color signals should be n:1.

8. The signal processing device of claim 6, further comprising:

identification means for generating a first identifying signal to be outputted for identifying the combination of two signals out of three constituting said first color signals with respect to a specified pixel or a second identifying signal to be outputted for identifying a signal having an amplitude of zero among the three signals two of which constitute said first color signals, wherein said second luminance signal, said second color signals and said first or second identifying signal are defined as a basic unit of output signals with respect to said specified pixel and said first data output means or said second data output means which receives an output signal from said identification means outputs any combination of signals associated with said basic unit in the form of said basic unit.

9. The signal processing device of claim 7, further comprising:

identification means for generating a first identifying signal to be outputted for identifying the combination of two signals out of three constituting said first color signals with respect to a specified pixel or a second identifying signal to be outputted for identifying a signal having an amplitude of zero among the three signals two of which constitute said first color signals, wherein said second luminance signal, said second color signals and said first or second identifying signal are defined as a basic unit of output signals with respect to said specified pixel and said first data output means or said second data output means which receives an output signal from said identification means outputs any combination of signals associated with said basic unit in the form of said basic unit.

10. The signal processing device of claim 8, further comprising:

demodulator means for demodulating signals including at least said basic unit of signals including said second luminance signal, said second color signals and said first or second identifying signal with respect to said specified pixel outputted from the signal processing device into a component image signal to be outputted consisting of said second luminance signal representing the luminance component and said second color signals representing the color component.

* * * * *